July 6, 1954 A. WARHOLOSKI 2,682,825
LAWN MOWER ATTACHMENT
Filed May 23, 1950
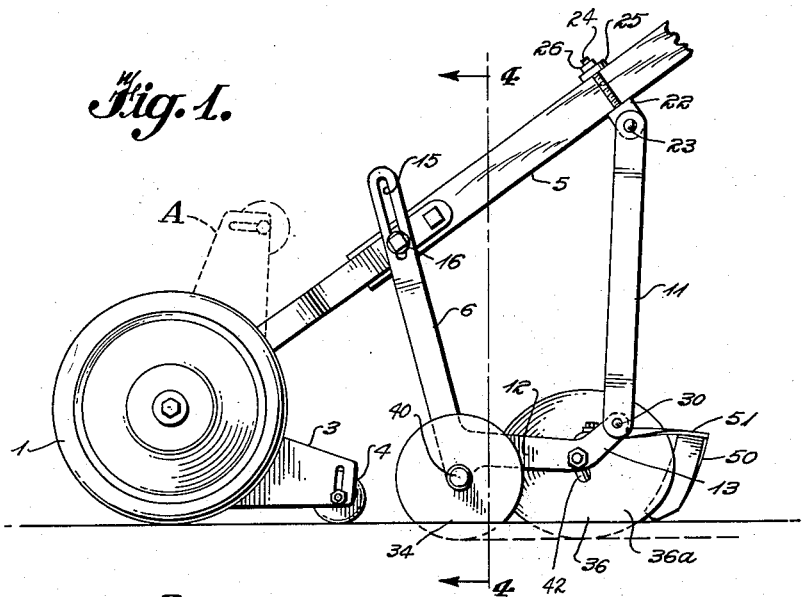
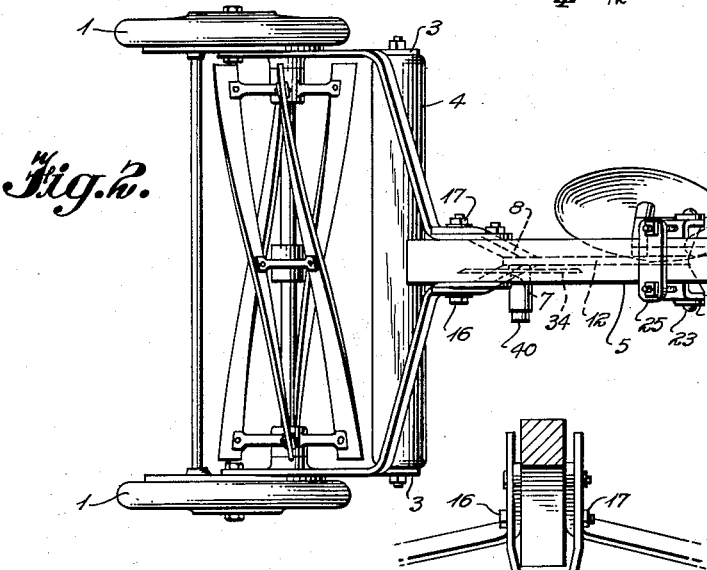
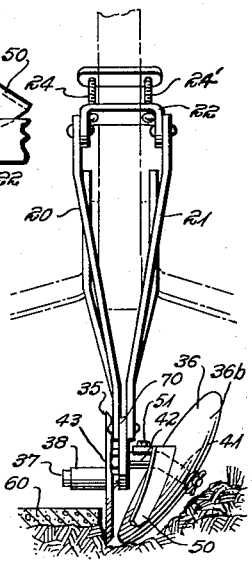
INVENTOR
August Warholoski
BY
ATTORNEY

Patented July 6, 1954

2,682,825

UNITED STATES PATENT OFFICE 2,682,825

LAWN MOWER ATTACHMENT

August Warholoski, Columbus, Nebr.

Application May 23, 1950, Serial No. 163,641

1 Claim. (Cl. 97—227)

This invention relates to an attachment for lawn mowers and more particularly to an attachment designed to effectively cut and cast aside that portion of a lawn, for example, paralleling a concrete walkway, roadway, or other surface which for neatness sake is usually separated at its edge from the lawn proper by a small trench or channel.

It is recognized that many attempts have previously been made to provide some form of device which will effectively edge or trim those areas referred to. By "edging" is meant the cutting away of the grass and layer of dirt immediately adjacent a concrete walkway or other hard bordering surface and disposing the cut material to one side thereof leaving a neat space in the form of a trench or gutter between the hard-surfaced material and the lawn proper. Prior devices, however, have not entirely solved the problem. The cutting must be cleanly accomplished and the disposal of the cut material in the manner referred to must be efficiently performed. The device of this invention meets these requirements.

In the embodiment of the invention here shown, the initial cutting is done by a single vertical rotary blade and the channel additionally shaped by another cutting blade mounted behind the first, disposed at an angle to the vertical and likewise disposed at an angle to the axis or direction of movement of the cutting operation. These angles are important aspects of my invention and the best operation is obtained when the two cutting blades are positioned angularly to each other in a manner I will hereinafter describe, and which is calculated to perform an edging operation in a simple but effective manner.

Accordingly, the primary object of my invention is to provide a device for cutting and casting aside bordering grass which is portable and attachable to any ordinary and common type of lawn mower.

It is a further object of the invention to achieve the aforesaid result through an apparatus that is adjustable, regarding the depth and width of the cut, within defined limits.

Additionally, it is a further object of the invention to provide an apparatus, capable of achieving the desired result, which is comprised of a minimum of moving parts and of such simplicity in construction and arrangement of elements as to enable its mass production at a reasonable and low expenditure.

Further objects and advantages of the present invention will be apparent from the following description, reference being made to the accompanying drawings wherein the preferred form of the present invention is clearly shown, like parts being referred to throughout the several views by the use of like numerals.

In the drawing:

Figure 1 is a side elevation view of a mechanism comprising my invention.

Figure 2 is a top plan view of the mechanism.

Figure 3 is a rear elevation view of the invention.

Figure 4 is a sectional view taken along the lines 4—4 of Figure 1.

Reference will now be made to the drawing where, as stated, the invention is shown as applied to a lawn mower of the ordinary and commercial type. This mower is characterized by the usual side wheels 1 and roller support 3, the latter in turn being provided with an adjustable roller 4. The usual lawn mower handle is indicated partly at 5, the whole element not being illustrated. Wheels 1 are adapted to drive a common type of rotary cutter in the usual and well-known manner.

In the drawing, it will be noted that the attachment is shown as applied to the mower when the blades of the latter are in cutting position. If this position is deemed undesirable by the operator, then, of course, the attachment may be affixed to the opposite side of handle 5 in which case the roller support 3 would occupy the position shown in dotted lines at A, Figure 1. In this latter position, of course, the cutting blades of the mower would be non-operative. The cutting blades of this attachment are supported by two downwardly extending support elements 6 and 11. By reference to Figure 4, it will be seen that the forward member 6 is a forked unit, the two sides of the fork, 7 and 8, being adapted to engage the mower handle in a manner to be hereinafter described. The adjustable element 6 is shown as being made integral with an extension 12 disposed at an angle approximately 110° to said element 6. This extension is also provided with an additional arm 13 designed as a support member, interconnected with element 11, for the angular cutting element. The interconnection thereof may take the form of a pivot as indicated at 30, Figure 1. The arm 13 is preferably disposed at an angle of approximately 45° to the said extension 12.

The arms 7 and 8 of the fork element 6 are each slotted as indicated at 15, the slots being designed to accommodate one of the handle bolts usually provided in lawn mowers of this general type. For example, as here shown, each side 7 and 8 is mounted on the handle by means of handle bolt 16 provided with the usual nut 17 which can be tightened to maintain the element in its desired and adjusted position. It will be readily understood that the aforesaid slots permit member 6 to be raised or lowered by the operator, who may, by this adjustable feature, vary the depth of the cut of the first or leading cutting blade 34 and alter the disposition of the cutting elements with respect to each other.

The other forked element 11 is mounted upon the handle in an analogous manner. For instance, the two arms thereof, 20 and 21, are each apertured to receive a bearing element 23 permitting member 11 to swivel upon the said bearing. Each bearing is in turn supported on a bearing mount 22 and the latter is maintained in the desired adjusted position by a plate 25 placed upon the opposite side of the handle, the whole assembly being securely affixed in the preferred position by the use of two complementary bolts 24 and 24' which are in threaded engagement with the usual retaining nuts 26. Obviously, as a result of this arrangement, when nuts 26 are loosened, the swivel mount may be slid to any desired position on the handle. The features just described permit full adjustment of the attachment to the preferable cutting position. The slotted connection with the forward supporting member 6, the swiveled and sliding characteristics of the mount for the following support member 11, all coact to permit considerable flexibility in the use of the apparatus comprising this invention.

Referring now to the cutting elements themselves, the first or forward blade is a circular cutting disc 34, the outer periphery of which is beveled as at 35 to form a sharp cutting edge. It will be noted that this blade is vertically mounted with respect to the surface over which the mower is operated and that its axis of rotation is at right angles to the direction of movement of the mower. In other words, this blade is so mounted as to accomplish a single vertical cut adjacent the hard surface, such as a road or walkway, which is being edged. The support for this disc comprises an extension of the forked unit 6, the said extension being represented at 19. The disc is provided with a bushing or collar 38 adapted to ride upon a bearing member 39 positioned upon support 19. The disc is, of course, mounted for rotation upon said bearing and is maintained in position by an enlarged head at one end of said bearing 39, and a nut 40a in threaded engagement with the opposite end of said bearing, as well known in the art.

The following and angularly inclined cutting disc 36 is also of circular shape but concave upon its inner side as at 36a and correspondingly convex upon its outside surface 36b. As in the case of the first cutting element, disc 36 is mounted for rotation upon a suitable bearing surface 41, the latter being an extension of member 42 and positioned at a substantial angle thereto. Member 42 is in turn affixed securely to an extension 70 of fork 11 by means of a nut tightened over a threaded portion at the terminal end of element 42.

As seen in Figure 3, it will be noted that the said following disc or cutter 36, by the angular positioning of bearing member 41, is mounted for cutting rotation at an angle to the vertical and also at an angle to the axis of the line of movement of the mechanism. I have found that in order for the following disc to effectively cut the opposite side of the trench, the effective angle off the vertical is approximately 40°, and that the angle with respect to the horizontal line of movement is preferably approximately 20°. These angles mentioned can be varied within certain limits by the positioning of bearing element 41 in various locations. This is simply done by loosening the retaining nut 43 and rotating member 42, such rotation consequently varying in some degree each of the angles referred to. The depth of the cut of each or both of the discs 34, 36 can also be substantially varied by adjustment of member 6, sliding the same up or down in slots 15, in the manner hereinbefore described. Further adjustment may be made by varying the position of a support 22 on the handle in the manner hereinbefore described. All of these features of adjustment enable the operator to fix the position of the two discs at the optimum for best performance. When located approximately in the position illustrated, the following disc 36 will effectively not only cut one side of the trench but also lift the cut material out of the trench and cast it to one side thereof.

I have found that it is desirable to provide a cleaner or wiper for the following disc, cutting element 36, and to this end I provide an angular element 50 the horizontal portion 51 of which is secured to member 42 in any convenient manner such as by common type of threaded bolt. It is desirable also that the cleaner be mounted for adjustment whereby it may be spaced at different desired distances from the periphery of cutting disc 36. The cleaning element prevents soft dirt or mud from clinging to cutting disc 36, thereby increasing the cutting efficiency of this element.

From the foregoing, the operation of this invention should be apparent. As stated, the attachment can be mounted upon either side of a conventional lawn mower handle and, when mounted as described, the cutting disc 34 is placed against the edge of a walkway, indicated at 60, so that the side surface of the disc is positioned parallel to and immediately adjacent the said walkway. With forward motion of the mower and a reasonable amount of pressure manually applied downwardly upon the handle, both discs are caused to rotate in a counter-clockwise direction. The leading disc, making the first cut, will obviously penetrate in a vertical direction; the following disc, by reason of its angular location, will perform an angular cut. At the same time, the convex shape of the following disc, mounted angularly in the manner described, will lift up and force to one side of the trench the cut material obtained from the action of both discs.

I have also found that the linear distance between the axes of the two cutting discs is of some importance for the best performance of the attachment. Preferably, the axis of the following disc 36 is positioned from the axis of the leading disc 34 at a distance approximately the same as the diameter of the leading disc. It will also be seen that in the construction herein described, cutting disc 36 is considerably larger than the vertical cutter 34.

The proportionate sizes of these two cutting elements are represented in the drawing where it will be appreciated that the following cutter 36 is between ¼ and ⅓ larger than cutter 34.

The various proportions, distances, and angles of mounting, enumerated in the foregoing, as comprised in this embodiment of my invention, all contribute to the successful performance of the attachment.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claim.

What I claim is:

In an edge trimming device adapted for attachment to a lawn mower handle, a forward generally vertically disposed, bifurcated supporting member having slots in the upper end thereof for vertical, adjustable interconnection with said handle and an angular, rearwardly disposed, longitudinal extension at the opposite end thereof, a rearwardly and generally vertically disposed supporting element having means at its upper end for slidable and vertically adjustable connection with said handle, said member having an axle at the lower end thereof, a vertically positioned rotatable cutting disc positioned on said axle, said axle being located near the juncture of said extension with said member, said element being pivotally connected to said extension at the end thereof, an angularly mounted rotatable cutting disc positioned on said extension adjacent the end thereof, mounting means for said last-named disc comprising a bearing member adjacent the end of said extension and spaced rearwardly from said vertical cutting disc, said angularly mounted disc being concave upon the side facing said vertical disc and convex upon the reverse side thereof, said bearing member being angularly disposed with respect to said rear supporting element and rotatable on said extension, and means to maintain said bearing member in fixed adjusted position whereby the angular disposition of said concave disc may be varied, said concave disc being positioned at an angle to the line of movement of said vertical disc and at an angle approximating 40° to the vertical, whereby material cut by said vertical disc is thrown to one side by said concave, angularly mounted disc.

References Cited in the file of this patent

UNITED STATES PATENTS

| Number | Name | Date |
|---|---|---|
| 129,712 | Bussell | July 23, 1872 |
| 1,000,028 | Lindsey | Aug. 8, 1911 |
| 1,127,764 | Huck | Feb. 9, 1915 |
| 1,720,169 | Cripe | July 9, 1929 |
| 1,770,434 | Schleicher | July 15, 1930 |
| 1,911,278 | Hines | May 30, 1933 |
| 1,916,725 | Harbour et al. | July 4, 1933 |
| 2,158,580 | Houser | May 16, 1939 |
| 2,418,954 | Raleigh | Apr. 15, 1947 |